No. 857,613. PATENTED JUNE 25, 1907.
A. GAGARINE.
MACHINE TO TEST MATERIALS, PRINCIPALLY FOR COMPRESSION.
APPLICATION FILED AUG. 4, 1906.
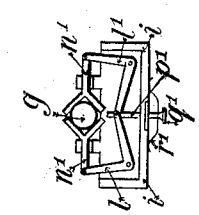
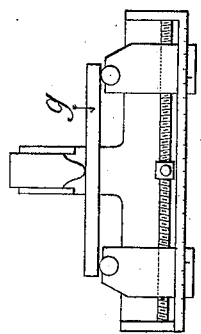
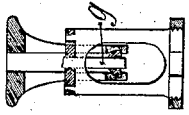
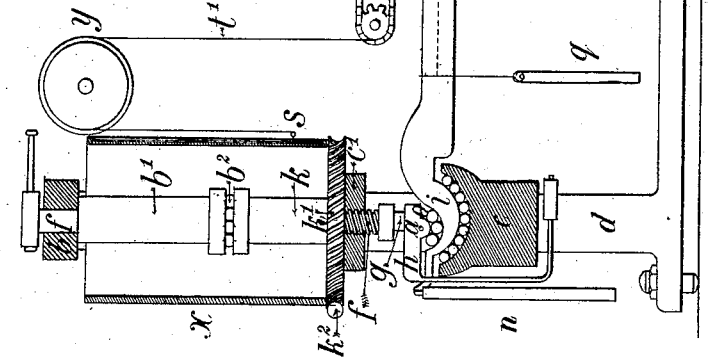
WITNESSES
INVENTOR
Andrew Gagarine
BY
ATTORNEY

UNITED STATES PATENT OFFICE.

ANDREW GAGARINE, OF ST. PETERSBURG, RUSSIA.

MACHINE TO TEST MATERIALS, PRINCIPALLY FOR COMPRESSION.

No. 857,613.     Specification of Letters Patent.     Patented June 25, 1907.

Application filed August 4, 1906. Serial No. 329,214.

*To all whom it may concern:*

Be it known that I, ANDREW GAGARINE, a subject of the Emperor of Russia, residing at St. Petersburg, Russia, have invented new and useful Improvements in Machines to Test Materials, Principally for Compression; and I hereby declare the following to be a full, clear, and exact description of the same, reference being had to the accompanying drawing.

The present invention has for its object a machine to test materials, principally for compression.

The construction of the machine proposed is shown on the annexed drawing, Figure 1 representing a vertical section of the same; Fig. 2 is a plan of the arrangement for adjusting and centering the sample of the material tested; Fig. 3 is a front view of the differential transmission, actuated by clock-work; Fig. 4 is an arrangement with the aid of which the machine may make tests of materials for tensile strength; Fig. 5 is an arrangement with the aid of which the machine may serve to test materials for bending strain.

The machine proposed consists of two stands, of which only the rear stand $d$ is shown in Fig. 1 of the annexed drawing. These stands are connected by two cross-pieces $c$ and $b$ and the strain produced in testing materials tends to push them apart from one another. Besides this, there is a third cross-piece $c_1$, which, together with cross-piece $b$, serves to direct screw $f$. For this purpose a tubular part $b_1$ projects from cross-piece $b$, inside which is located the upper part of the stem of screw $f$. The lower part of this screw is surrounded by washer $k$ furnished with a screw wheel $k_1$, which is revolved with the aid of a worm $k_2$ from some kind of engine. A drum $x$ with ruled paper is fixed on nut $k$.

In turning nut $k$ it presses by means of balls $b_2$ into the lower end of tube $b_1$ of cross-piece $b$ and forces down screw $f$, which is kept from turning with the aid of a key and key-way and screw $f$ compresses the sample of the material tested $g$ with some determined strain P.

The arrangement shown in Fig. 2 serves to adjust and center the sample on the upper surface or table of plate $h$. This arrangement consists of hinged lever $l_1$ and $l_1$, ending in the shape of lugs $n_1$ and $n_1$. The ends of levers $l_1$ and $l_1$ are connected hingewise with stem $p_1$, ending in the shape of a button $q_1$, which is continually drawn back by a flat spring $r_1$. For inserting the sample of the material tested into the machine it is pressed between lugs $n_1$ and $n_1$ and then the whole arrangement is slid with edges $i_1$ and $i_1$ on the plate or table $h$. When this arrangement has slid to the end, the sample of material $g$ will occupy such a position that its axle will correspond with the axle of screw $f$. After that, on pressing $q_1$, with the finger, lugs $n_1$ and $n_1$ are carefully withdrawn from sample $g$ and the whole arrangement is then drawn back, leaving sample $g$ on the spot.

The lower semi-cylindrical surface of plate $h$ rests on cycle balls (the upper row). The balls distribute the strain of P. on the upper semi-cylindrical bent-in surface of part $i$ of lever $j$. The lower side of part $i$, is made hollow and rests on the lower row of cycle balls, transmitting pressure on the lining, forming part of cross-piece $c$. Two rows of balls form a compression, but not a bending of part $i$, which would change the dimensions of amount $e$ referred to later.

Axle $a$ of the upper bent-in surface of part $i$ and axle $o$ of the hollow lower surface are on horizontal level with the lever and are perpendicular to its vertical plane. The distance between them, $a\,o = e$ forms a small shoulder of the lever, as axle $o$ is rigid, whereas the resultant force, transmitted to the lever by the upper row of balls is equal to P., which has a vertical direction, is applied to axle $a$ and tends to lower same.

Lever $j$ is held in horizontal position by moving away weight $p$ a distance $l$, the weight named traveling along its long shoulder, establishing an equilibrium P. $e = p.\,l$.

Counterweight $n$ serves to hold the lever in horizontal position in the case when the machine does not develop any strain and when weight $p$. stands on zero. This weight consists of several parts, of which certain parts $p$ are movable and others $q$ may remain on zero or be placed on some determined division. Owing to this, there is a possibility of measuring the strain in different scales without touching counterweight $n$, as the amount of the weights $p$ and $q$ remains constant.

The end of the long shoulder of the lever swings between two adjusting screws $m$ and $m_1$. Two flexible plates $z_1$ and $z_2$, fastened to this end, stop the movement of one clock-work mechanism $u\,u_1\,u_2\,u_3\,u_4\,u_5\,u_6\,u_7$ or another clock-work mechanism $v$—$v_7$, of which only wheel $v_7$ is shown in Fig. 1 and only wheel $v_2$ in Fig. 3. The movement of these mechanisms revolves wheels $u_7$ and $v_7$ in reverse directions. The mechanisms are connected by a differential transmission, bring about the movement of chain $t$ either in one or the other direction. Movable weight $p$ (Fig. 1) may be connected at any moment with this chain by means of stem $r$, which may be drawn out. At the same time weight $p$ is carried by the chain to the spot where an equilibrium is established with strain P. At this moment the lever occupies a horizontal position, both clock-work mechanisms travel at the same time in reverse directions and the movement of weight $p$ stops.

When strain P. changes, weight $p$ watches these changes and moves automatically into a position in which it equalizes strain P. It draws string $t_1$, which raises pen $s$ on drum $x$, fixed with a small amount of friction on nut $k$. String $t_1$ surrounds the differential pulley $y$, which is calculated in such a way that the kilograms of pressure should correspond to whole millimeters of the height of the rise of pen $s$. This height is proportional to the strains P. and the horizontal movement of the surface of the drum, as regards the pen, is proportional to the lowering of the screw and the decrease of the height of the beam (sample) under the action of screw $f$. Thus a diagram of large scale is obtained on the drum, with the aid of which it is possible to ascertain the limit of elasticity of the material tested with ease and accuracy. As this limit is equal to the maximum strain, which was applied to the material before it was placed into the proposed machine (press), the latter can determine exactly the unknown strains, which the sample of material underwent preliminarily, such as unpressed crusher cylinders for instance.

The machine proposed may be used for testing materials for tensile strength with the aid of an ordinary arrangement represented in Fig. 4 or for bending with the aid of the arrangement shown in Fig. 5.

Claim:

Machine for testing materials comprising, in combination with the testing mechanism, a lever, a semi-circular shoulder thereon, a ball-bearing for supporting said shoulder, a counterweight to balance the said lever, a traveling weight on said lever, a clock work for moving the same, means for applying the test force to said lever, a drum, means for revolving said drum in accordance with the yielding movement of the specimen tested, a pen, a differential pulley and a connection between said pen and said traveling weight.

In testimony whereof, I have signed my name to this specification in the presence of two subscribing witnesses.

ANDREW GAGARINE.

Witnesses:
H. A. LOVIAGUINE,
EDWARD WANVCLEIDT.